United States Patent [19]
Coffin

[11] Patent Number: 5,896,197
[45] Date of Patent: Apr. 20, 1999

[54] INTERFEROMETER HAVING GLASS GRAPHITE BEARING

[75] Inventor: John Coffin, Blue Mounds, Wis.

[73] Assignee: Nicolet Instrument Corporation, Madison, Wis.

[21] Appl. No.: 07/818,162

[22] Filed: Jan. 8, 1992

[51] Int. Cl.[6] .................................................. G01B 9/02
[52] U.S. Cl. ........................................................ 356/346
[58] Field of Search .................................. 356/345, 346; 359/871, 872

[56] References Cited

U.S. PATENT DOCUMENTS

| | | | |
|---|---|---|---|
| 3,936,193 | 2/1976 | Auth | 356/346 |
| 3,984,190 | 10/1976 | Barrett et al. | |
| 3,999,854 | 12/1976 | Barrett . | |
| 4,005,937 | 2/1977 | Barrett . | |
| 4,011,013 | 3/1977 | Barrett . | |
| 4,165,183 | 8/1979 | Hall et al. | |
| 4,426,155 | 1/1984 | Monchalin . | |
| 4,480,914 | 11/1984 | Thompson et al. | |
| 4,666,296 | 5/1987 | Bailly-Salins . | |
| 4,710,001 | 12/1987 | Lacey | 356/346 |
| 4,828,367 | 5/1989 | Curbelo et al. | 356/346 |
| 5,107,366 | 4/1992 | Huang et al. | 356/346 |

FOREIGN PATENT DOCUMENTS

A0151057  8/1985  European Pat. Off. .

OTHER PUBLICATIONS

IBM Technical Disclosure Bulletin, "Interferometer With Mercury Bearings", vol. 31, No. 9, Feb. 1989, New York, pp. 244–246.

IBM Technical Disclosure Bulletin, anonymous, "Balance Beam Interferometer", vol. 29, No. 2, Jul. 1986, New York, pp. 574–576.

Catalog published by Airpot, published prior to 1992.

Brochure published by Airpot Corporation entitled Pneumatic Actuator Series 56, publication published to 1992.

Primary Examiner—Samuel A. Turner
Attorney, Agent, or Firm—Foley & Lardner

[57] ABSTRACT

A bearing for allowing the movement of a movable mirror in a Michelson interferometer includes a stationary hollow glass cylinder and a movable assembly which includes the movable mirror and at least one graphite member, the graphite member being slidably disposed within the bore of the glass cylinder. Preferably, there is an anti-rotation system for the movable assembly which includes a post coupled with the movable assembly, a magnet mounted on one end of the post and a stationary guide rail positioned substantially parallel to the axis of rotation of the movable assembly and at a predetermined radial distance from the movable assembly.

21 Claims, 11 Drawing Sheets

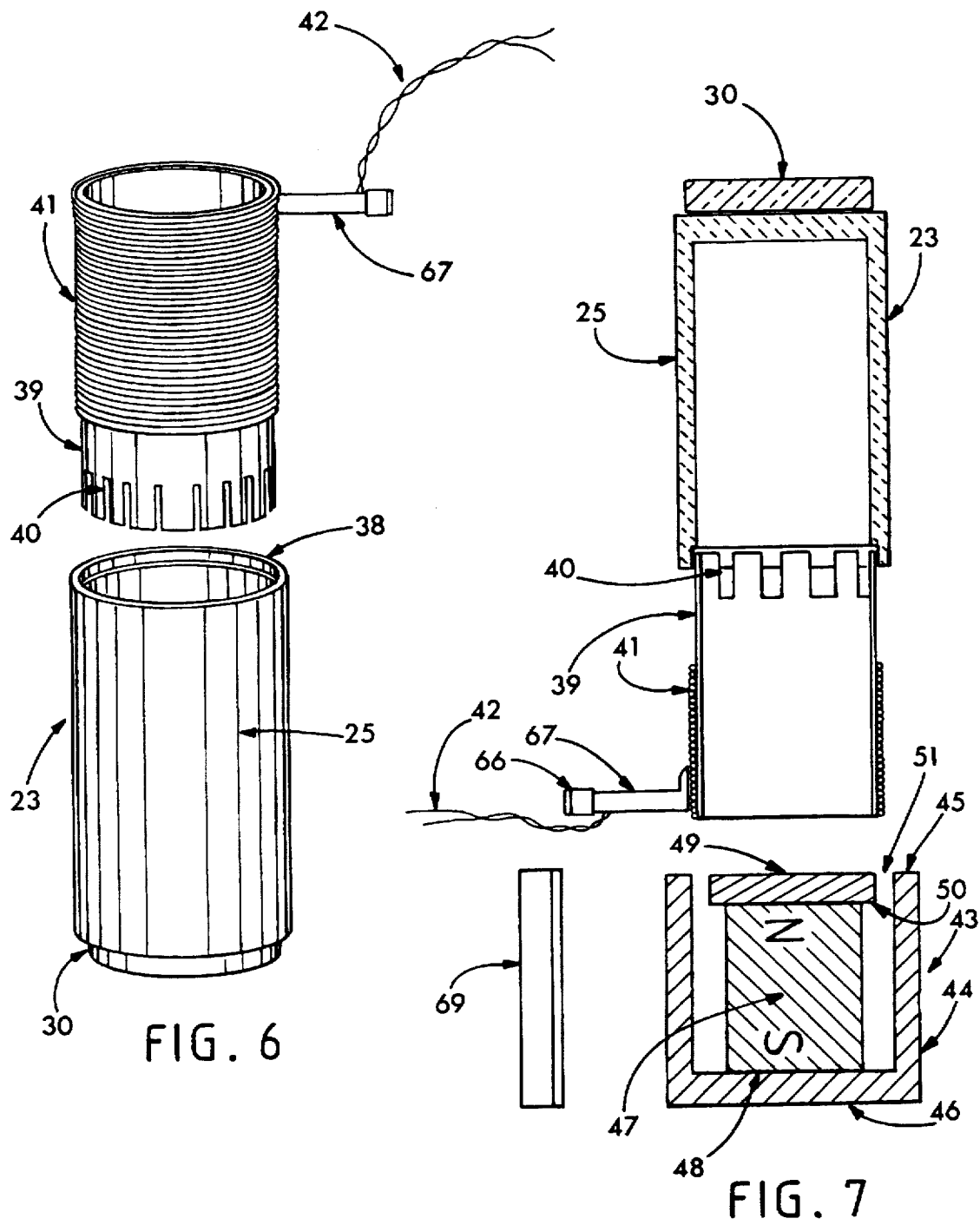

INTERFEROMETER HAVING GLASS GRAPHITE BEARING

BACKGROUND OF THE INVENTION

The present invention relates to an improved design for a Michelson interferometer and more particularly to an apparatus for precision movement of a movable mirror in a Michelson interferometer.

Michelson interferometers are used in spectrometers which provide spectroscopic data such as light wavelength, line position, intensity and absorption coefficient. A typical Michelson interferometer employs a half-silvered mirror or beam splitter, placed at a 45° angle with respect to the electromagnetic radiation being measured. The beam splitter divides the radiation into two parts, and each part is directed along a separate perpendicular path within the interferometer. One part of the radiation is reflected off of a fixed mirror. The other part is reflected off of a movable mirror. The two parts are then recombined at the beam splitter and optically interfere with each other to a degree proportional to their phase displacement. The phase displacement between the two parts is generated by the inequality in the path lengths between the movable mirror and the fixed mirror.

In a Michelson interferometer the alignment of the movable mirror must be maintained to a very high degree of precision as it travels toward and away from the beam splitter. In particular, the movable mirror should be able to move over a distance or stroke length of several centimeters while tilting less than a few arc-seconds.

State of the art Michelson interferometers use either air bearings or mechanical pivot-type bearings which require costly close tolerance machining and assembly for controlling the tilt of the movable mirror as it moves. Air bearings, such as those described in U.S. Pat. No. 3,936,193, offer higher performance but are expensive and require an air compressor and filter to supply compressed air. Mechanical pivot-type bearings, such as those described in U.S. Pat. Nos. 3,984,190 and 4,828,367, have certain limitations. Bearings of this type can have errors in the mirror alignment as the mirror moves. These alignment problems worsen at long stroke lengths, thus limiting the stroke length and system resolution. Moreover, these bearings are subject to wear and degradation. The mechanical bearings also have poor damping and tend to capture or generate mechanical and acoustical vibrations, thereby causing noise in the system output data.

SUMMARY OF THE INVENTION

The present invention provides an improved low cost bearing apparatus for moving the movable mirror of a Michelson interferometer which has a highly precise mirror alignment control, long stroke length, excellent vibration damping and reduced sensitivity to external vibrations. The bearing also is lightweight and permits the use of a low weight movable mirror assembly. By reducing the weight of the assembly which includes the bearing, drive motor and the movable mirror, low cost, and low power control systems can be utilized for actuating the movable mirror and high scanning speeds can be achieved for evaluating rapidly changing samples. The present invention also provides a method of assembly which facilitates the consistent production of the present apparatus.

The interferometer of the present invention includes a stationary block, a mirror which is movable relative to said stationary block, means for propelling the movable mirror, and a bearing for mounting the mirror for movement, the bearing including a stationary hollow cylinder comprised of glass and a movable assembly including the movable mirror and at least one circular member comprised of graphite, wherein the graphite member is slidably disposed within the bore of the glass cylinder.

In one embodiment of the invention, the movable assembly includes first and second graphite pistons, each of which have an open end and a closed end, and a spacer tube positioned between the first and second graphite pistons, wherein the movable mirror is mounted on the open end of the first graphite piston. In a second embodiment of the invention, the graphite member comprises a graphite piston having the movable mirror mounted on one end and the glass cylinder is disposed within an opening provided in the stationary block. In a third embodiment, the graphite member is supported on a bearing support tube and can be in the form of either a continuous cylinder or a plurality of rings and the glass cylinder is disposed within a magnet assembly.

There also is provided according to the present invention an anti-rotation system wherein the interferometer further comprises a magnet coupled, i.e., movable and rotatable, with the movable assembly post, and a stationary guide rail positioned substantially parallel to the axis of rotation of the movable assembly and at a predetermined radial distance from the movable assembly.

There also is provided according to the present invention a method of assembling an interferometer, wherein the interferometer includes a stationary block provided with an integral cylindrical sleeve having a raised platform along its inner diameter, a plurality of bores through its cylindrical wall and at least one inlet through its cylindrical wall; a mirror which is movable relative to the stationary block, a stationary hollow cylinder comprised of glass; and a movable assembly slidably disposed within the bore of the glass cylinder, wherein the method comprises aligning the glass cylinder with the cylindrical sleeve via the steps of: placing a foam ring within the cylindrical sleeve so that said foam ring fixedly rests against a raised wall of the raised platform; inserting the glass cylinder into the cylindrical sleeve; placing a plug into the opening at a first end of the glass cylinder; inserting angle adjustment screws into the bores; determining the alignment angle such as by using an autocollimator; adjusting the angle adjustment screws until the glass cylinder is aligned properly; and introducing epoxy resin between the outer surface of the glass cylinder and the raised platform via the inlet.

Further objects, features and advantages of the present invention will become apparent from the following description taken in conjunction with the accompanying drawings.

BRIEF DESCRIPTION OF THE DRAWINGS

In the drawings:

FIG. 6 is a perspective view of a portion of the interferometer of FIG. 3 which includes a voice coil type linear motor;

FIG. 7 is a sectional view of a portion of the interferometer embodiment of FIG. 3 which includes a magnet assembly;

DETAILED DESCRIPTION OF THE PREFERRED EMBODIMENTS

Figure 1:
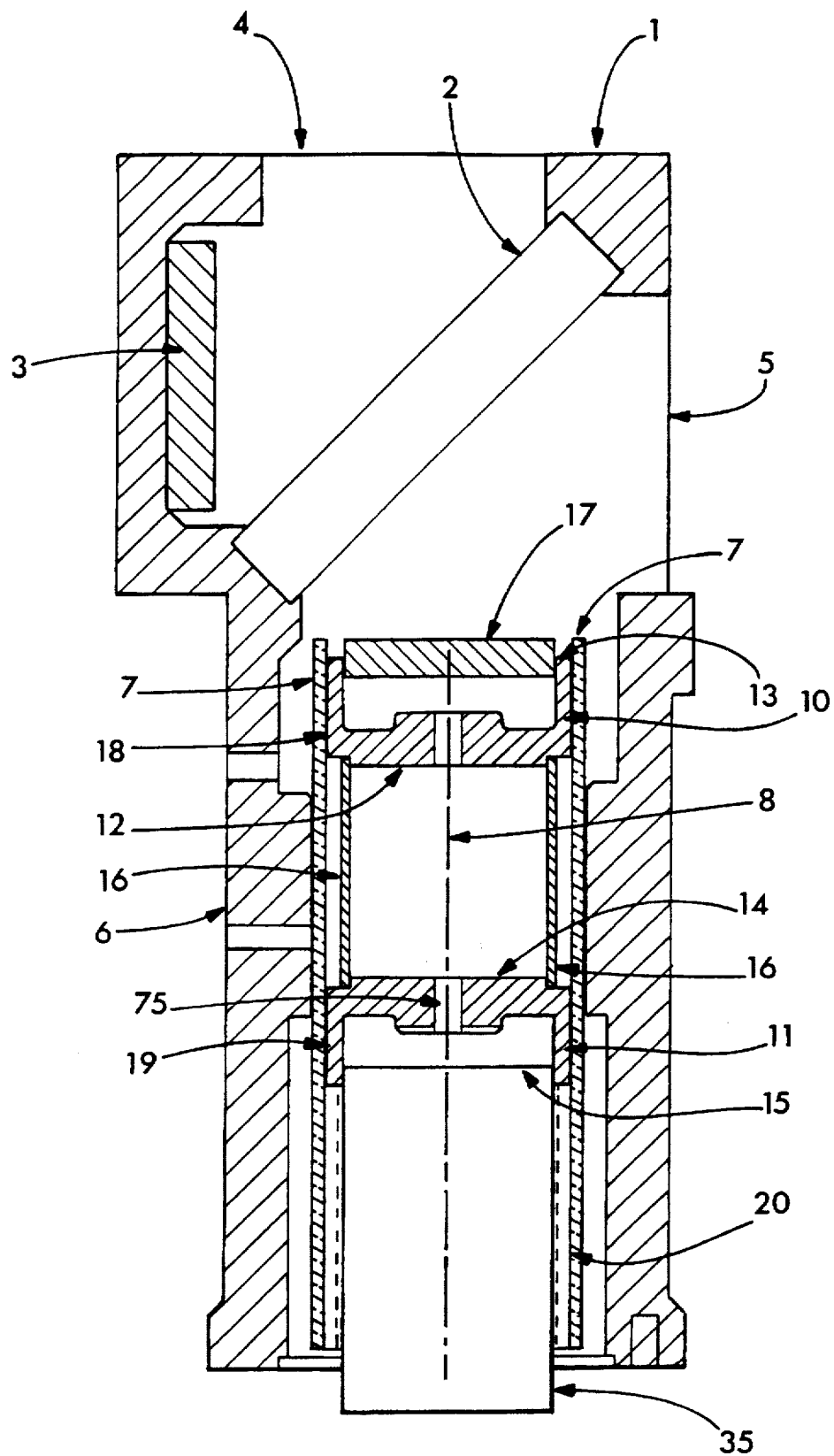
FIG. 1 is a sectional view of an interferometer incorporating the invention.
Figure 2:
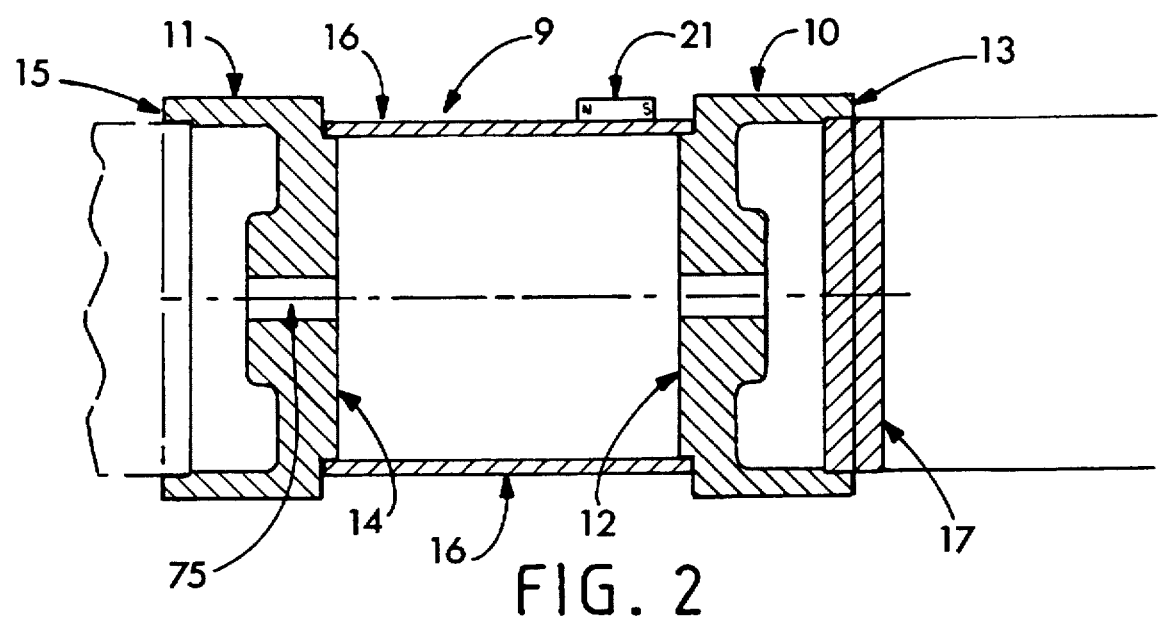
FIG. 2 is a sectional view of a portion of the movable assembly of the interferometer of FIG. 1.

According to a preferred embodiment of the present invention shown in FIGS. 1 and 2 there is provided a Michelson interferometer base block 1 on which is mounted a beam splitter 2, a fixed mirror 3, a window (opening) 4 for incoming light and a window (opening) 5 for outgoing light. The beam splitter 2, fixed mirror 3 and windows 4 and 5 are constructed and positioned according to conventional Michelson interferometer designs.

In the embodiment of FIG. 1, the interferometer block 1 has an integrally formed hollow cylindrical sleeve 6 thereon. Advantageously, the interferometer block 1 is constructed of a ferrous or carbon alloy such as cast iron or steel. Fixedly held within the cylindrical sleeve 6 is a stationary hollow glass (preferably Pyrex® glass.) cylinder 7 having a central axis 8. Disposed concentrically within the bore of the glass cylinder 7 is a movable mirror assembly 9 which can slide along a path parallel to the axis 8 of the glass cylinder 7.

The movable mirror assembly 9, which is depicted in detail in FIG. 2, includes a first graphite piston 10 and a second graphite piston 11, each of which are in the shape of a cup. The first graphite piston 10 has a closed end 12 and an open end 13. Similarly, the second graphite piston 11 has a closed end 14 and an open end 15. The pistons 10 and 11 can be provided with holes 75 to facilitate their handling during assembly. A spacer tube 16, preferably comprised of glass, is positioned between the first and second graphite pistons 10 and 11 so that one end of the spacer tube 16 is attached to the closed end 12 of the first graphite piston 10 and the other end of the spacer tube 16 is attached to the closed end 14 of the second graphite piston 11. The spacer tube 16 can be connected to the graphite pistons via any conventional means. Preferably, the closed ends of the graphite pistons are formed with recessed shoulders upon which the inner surface of the spacer tube 16 rests. The spacer tube 16 is attached to the shoulders of the graphite pistons via an adhesive.

A circular movable mirror 17 is fixedly supported by the wall of the open end 13 of the first graphite piston 10. Preferably, in order to support the movable mirror 17 at least a portion of the circumferential surface of the movable mirror 17 is flush against the inner surface of the wall of the open end 13. Since the movable mirror 17 is fixedly attached to the first graphite piston 10, it is apparent that, as the assembly 9 moves, the movable mirror 16 moves with respect to the beam splitter 2 along a line corresponding to the axis 8 of the glass cylinder 7.

The first and second graphite pistons 10 and 11 have bearing surfaces 18 and 19, respectively, which oppose an inner surface 20 of the glass cylinder 7. The outer surface of the spacer tube 16, on the other hand, does not contact the inner surface 20 of the glass cylinder 7. It will be understood that the assembly 9 is supported by and slides within the glass cylinder 7 via the bearing surfaces 18 and 19. The graphite and glass utilized to construct the graphite pistons 10 and 11 and the glass cylinder 7, respectively, have very similar static and dynamic coefficients of friction. The sliding of the assembly 9 within the glass cylinder 7 thus occurs very smoothly.

Moreover, the graphite and glass materials used according to the present invention should have similar thermal expansion coefficients. As a result, the clearance between the graphite bearing surfaces 18 and 19 and the inner surface 20 of the glass cylinder 7 can be very small, e.g., within about 0.001 to 0.003 inches. This small clearance and the viscosity of air helps trap air which acts as an additional support for increasing the stiffness of the glass/graphite bearing.

A preferred glass cylinder/graphite piston combination is available from Airpot Corporation. The described glass cylinder/graphite piston combination may, of course, be reversed. In other words, the cylinder 7 can be comprised of graphite and the pistons 10 and 11 can be comprised of glass.

The dimensions of the glass cylinder 7 and the assembly 9 can be selected to obtain the desired stroke length, which is directly proportional to the resolution of the interferometer. Preferably, the length of the glass cylinder 7 is about 5 inches, the length of the movable assembly measured from the open ends 13 and 15 of the graphite pistons is about 3 inches, the diameter of the bore of the glass cylinder 7 is about 1.75 inches and the inner diameter of the open ends 13 and 15 is about 1.52 to 1.53 inches. This particular embodiment would provide a stroke length of about 2 inches.

The assembly 9 also can include a lift magnet 21 located on the outer surface of the spacer tube 16. If the interferometer is utilized so that the movable assembly 9 is in a horizontal position, the attraction between the lift magnet 21 placed on the upper portion of the spacer tube 16 and the metal of the interferometer block sleeve 6 assists the movement of the assembly 9 by alleviating partially the frictional resistance between the assembly 9 and the lower half of the glass cylinder 7. The magnitude of the attraction between the lift magnet 21 and the interferometer block sleeve 6, however, must be limited so as not to interfere adversely with the movement of the assembly 9.

Figure 3:
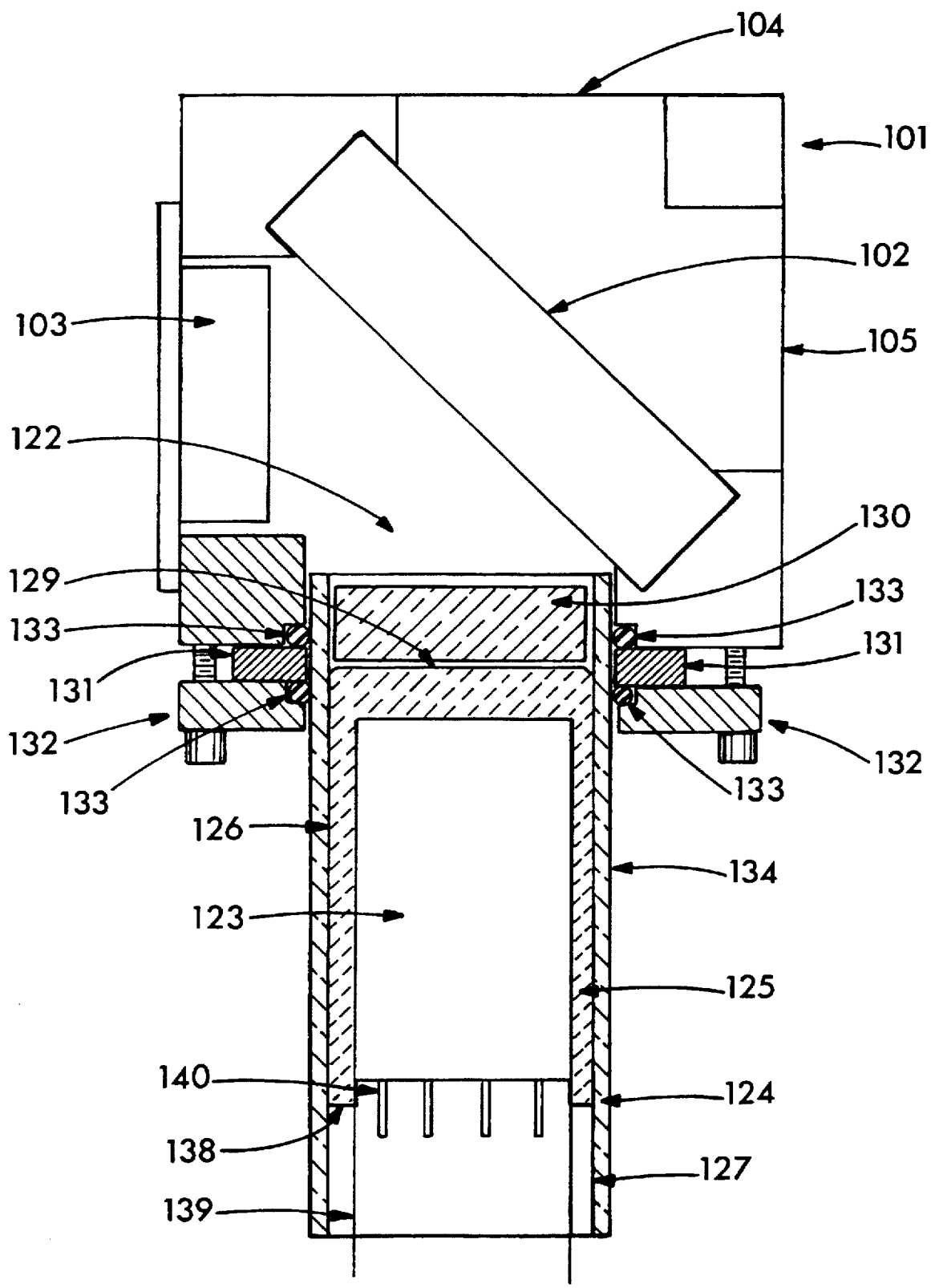
FIG. 3 is a sectional view of a second embodiment of an interferometer of the invention.
Figure 4:
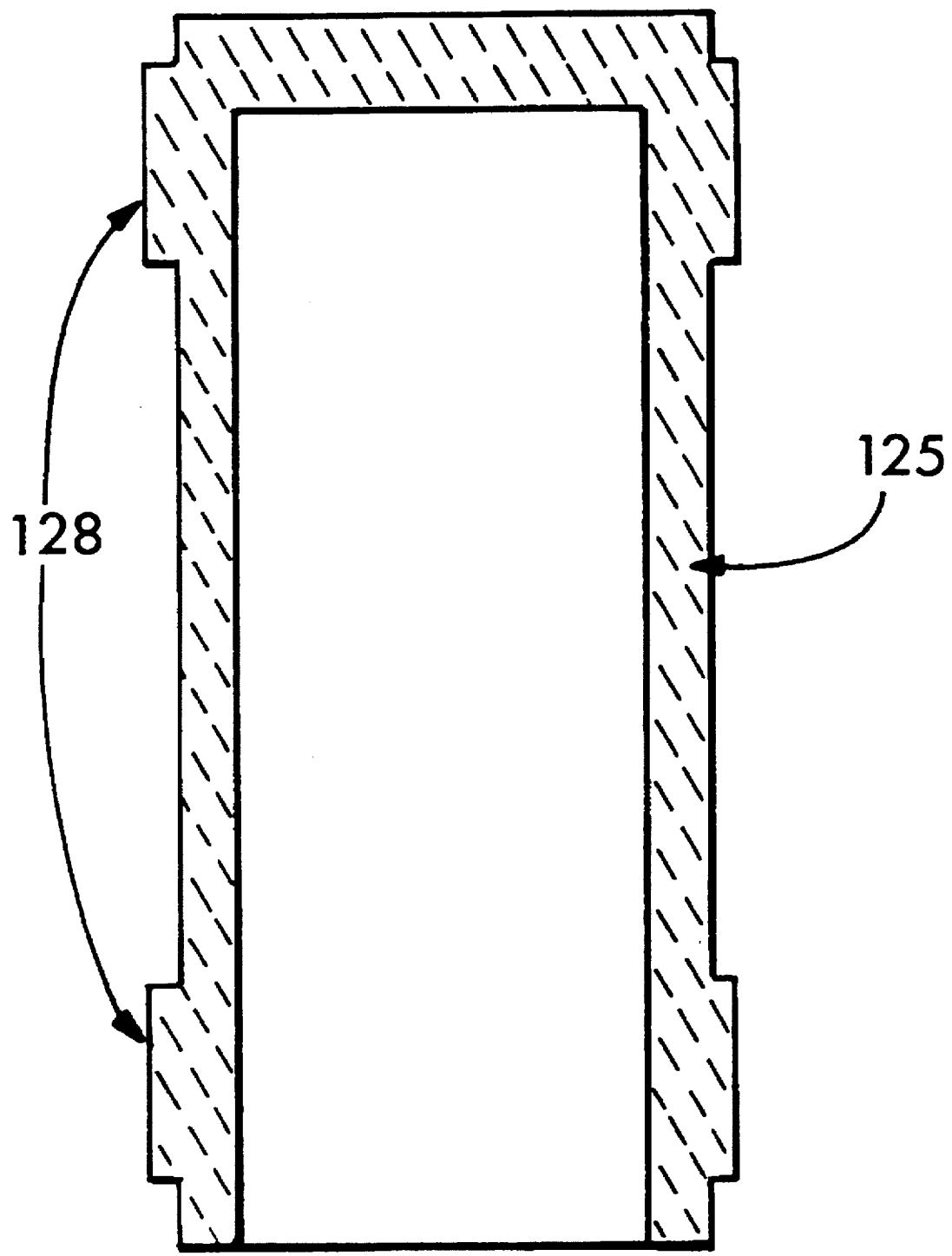
FIG. 4 is a sectional view of another design of the graphite piston of the second interferometer embodiment.

According to a second embodiment of the present invention shown in FIGS. 3 and 4 there is provided a Michelson interferometer block 101 which includes a beam splitter 102, a fixed mirror 103, a window 104 for incoming light, a window 105 for outgoing light and an opening 122 for receiving a movable mirror. These components are constructed and positioned according to conventional Michelson interferometer designs.

In this second embodiment, a movable mirror assembly 123 is disposed concentrically within a stationary hollow glass, preferably Pyrex® glass, cylinder 124 so that the assembly 123 can slide within the glass cylinder 124. The assembly 123 includes a graphite piston 125 in the shape of a cup. The graphite piston has a bearing surface 126 which opposes an inner surface 127 of the glass cylinder 124. The bearing surface 126 preferably is substantially planar. As shown in FIG. 4, the graphite piston 125 also can be formed to have rings 128, preferably at or near the ends of the piston 125.

Similar to the first described embodiment, the glass cylinder 124 and the graphite piston 125 can have any length desired but preferably the glass cylinder 124 is about 5 inches long and the graphite piston 125 is about 3 inches long. In addition, the types of glass and graphite employed to construct the cylinder 124 and piston 125 is the same as described previously. It is also possible that the cylinder 124 can be constructed of graphite and the piston 125 constructed of glass. In either alternative the sliding of the assembly 123 within the glass cylinder 124 occurs very smoothly due to the glass/graphite bearing contact, the advantages of which are detailed above.

A first end 129 of the graphite piston 125 is closed and supports a movable mirror 130 which is positioned perpendicular to the cylindrical axis of the graphite piston 125. The assembly 123 and the glass cylinder 124 are arranged in such a manner that, as the graphite piston 125 moves, the mirror 130 moves with respect to the beam splitter 2 along a line corresponding to the cylindrical axis of the glass cylinder 124.

Preferably, the mirror 130 is a flat glass mirror or a flat replicated mirror. The glass mirror is mounted on the graphite piston 125 via epoxy. A replicated mirror may be formed as an integral part of the graphite piston 125.

The glass cylinder 124 is fixedly attached to a metal ring 131 which is mounted onto the interferometer block 101 via a clamp 132. To assemble the glass cylinder/interferometer block according to the present invention it is advantageous to provide an O-ring, foam ring or foam square 133 on one or both sides of, and in contact with, the metal ring 131. The metal ring 131 comprises a metal, preferably titanium, Covar or steel, which substantially matches the coefficient of expansion of the glass cylinder 124. After the glass cylinder 124 is aligned with respect to the beam splitter 2, epoxy is introduced into a space defined by the ring 133, the metal ring 131 and an outer surface 134 of the glass cylinder 124. once the epoxy sets, the ring 127 can be left in place.

Figure 5:
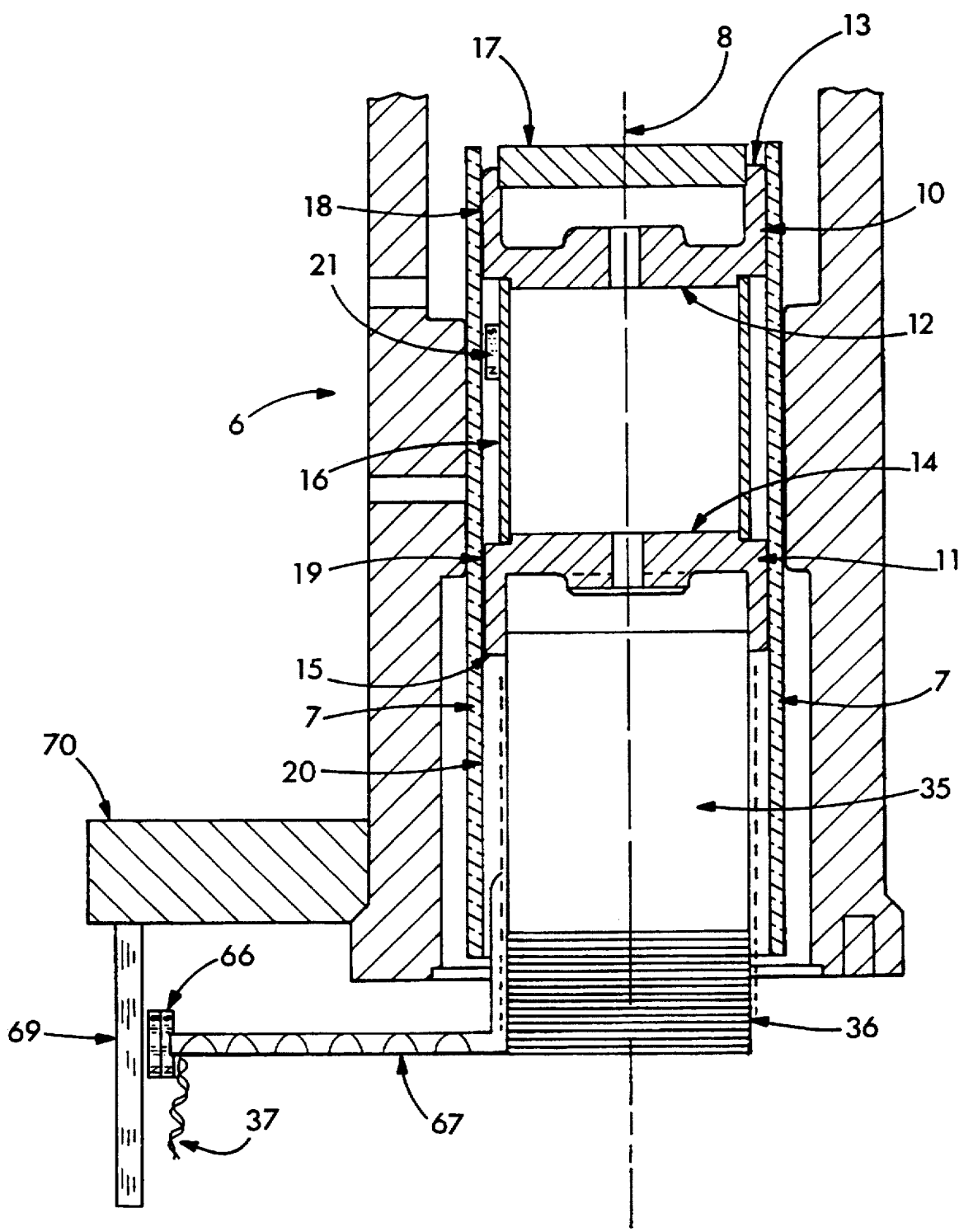
FIG. 5 is a sectional view of the interferometer of FIG. 1 which includes an anti-rotation assembly.

In accordance with the present invention there is provided with each of the described embodiments a mechanism for linearly actuating the movable mirror assemblies along the central or cylindrical axes of the glass cylinders. FIGS. 5–7 illustrate a preferred embodiment of the actuating mechanism which utilizes a voice coil linear motor.

In the preferred embodiment there is fitted concentrically within the opening of the open end 15 of the second graphite piston 11 a hollow coil support tube 35 as shown in FIG. 5. The coil support tube 35 can be constructed of aluminum, KAPTON, available from E.I. du Pont, Nomex®, available from E.I. du Pont, or similar materials. Epoxy or a similar adhesive can be used to fix the coil support tube 35 to the second graphite piston 11.

A coil of conductive wire or voice coil 36 is wrapped around an outside portion of the coil support tube 35. The voice coil 36 can extend over the full length of the coil support tube 35, but preferably extends only over a length which is slightly greater than the desired stroke length. For example, if the desired stroke length is about 2 inches, the voice coil 36 should extend over about 2.25 to 2.60 inches of the coil support tube 35. Lead wires 37 connect the voice coil to an electricity generating source (not shown). The coil support tube 35 preferably has a thickness of about 0.005 inches.

Figure 8A:
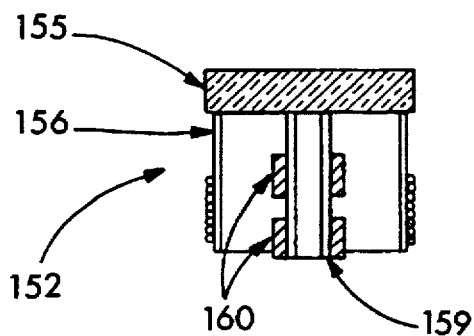
FIG. 8A is a sectional view of another embodiment of a bearing in accordance with the invention.
Figure 8B:
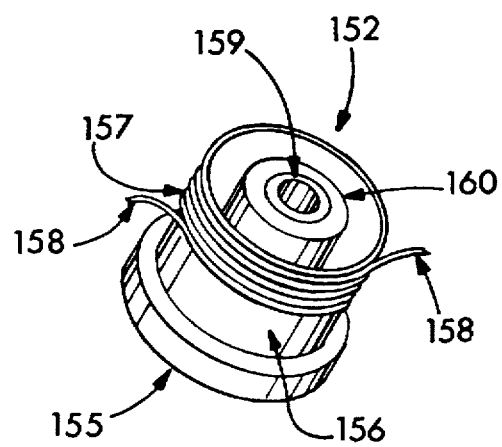
FIGS. 8B and 8C are perspective views of the embodiment of FIG. 8A.
Figure 8C:
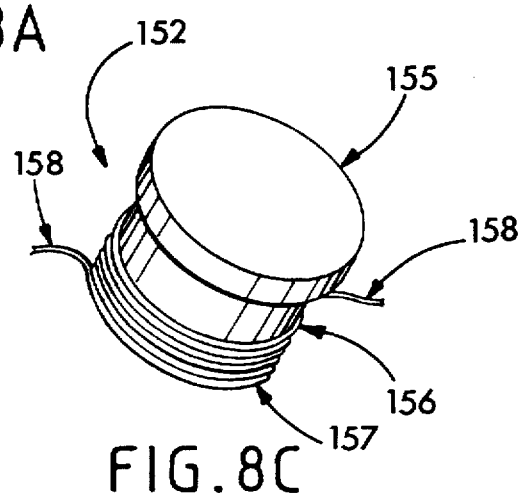
Figure 8D:
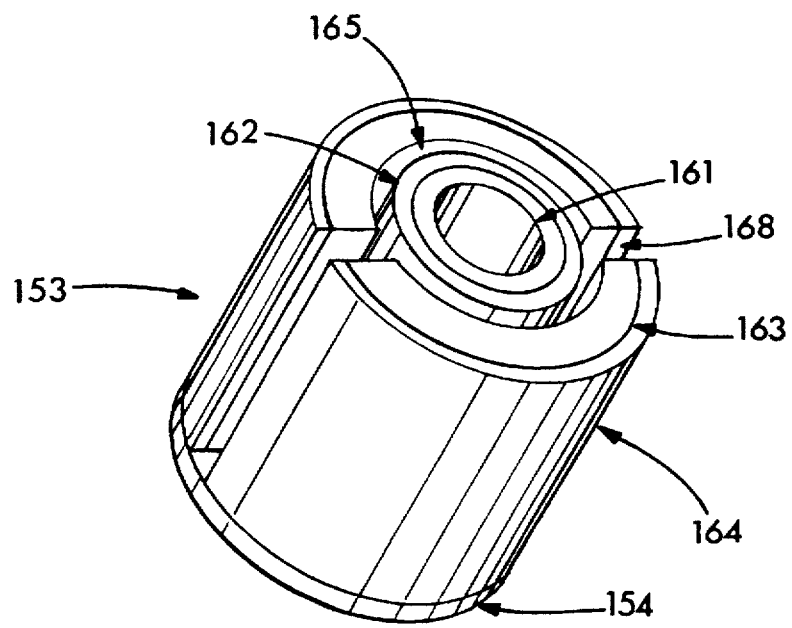
FIG. 8D is a perspective view of the magnet assembly used with the embodiment of FIG. 8A.

As an alternative to the preferred embodiment described above, it is possible to employ a "sea of flux" magnet assembly design (not shown) which is known for use with actuators for disk drive rotating memory designs. The "sea of flux" provides a magnetic field longer than the voice coil to insure that all of the voice coil is in the magnetic field all of the time, and can be used with a coil structure as illustrated in FIG. 8D. A "sea of flux" design can include a series of magnets arrayed in a C-clamp arrangement around the coil support tube 35. The coil support tube 35, therefore, should be of sufficient length to extend into the radial magnetic flux field generated by the "sea of flux" magnet assembly.

With reference again to the preferred embodiment, the voice coil 36 should be of sufficient length so that at least a portion of it is inside the magnetic flux field during operation of the interferometer. When the voice coil 36 has current flowing through it and is within the magnetic flux field an electromagnetic force results which propels the overall movable mirror assembly 9 along the axis 8 of the glass cylinder 7. In conjunction with the above-described second embodiment, concentrically attached to a second end 38 of the graphite piston 25 is a hollow coil support tube 39 as shown in FIGS. 6 and 7. The coil support tube 39 can be constructed of the same materials as described in connection with coil support tube 35. Preferably, the coil support tube 39 fits within the diameter of the graphite piston 25 and is fixed to the inside surface of the graphite piston 25. Epoxy can be used to fix the coil support tube 39 to the graphite piston 25. The end of the coil support tube 39 which is attached to the graphite piston 25 can be provided with slots 40 so that any change in the coil support tube 39 diameter caused by temperature fluctuations or epoxy shrinkage will be absorbed by the flexibility of the slotted portion.

A voice coil 41 is wrapped around an outside portion of the coil support tube 39. The voice coil 41 can extend from the end of the coil support tube 39 farthest away from the graphite piston 25 to the slotted portion of the coil support tube 39 or over a shorter distance between these two points. Lead wires 42 connect the voice coil 41 to an electricity generating source (not shown).

The voice coil 41 (of either embodiment) extends into a magnetic flux field generated by a stationary magnet assembly 43. As shown in FIG. 7, the magnet assembly 43 includes an outer pole member 44 which is the shape of a cylindrical housing having an open end 45 and a closed end 46. Concentrically positioned within the outer pole member 44 is a cylindrical magnet member 47 which has a first end 48 contiguous to the closed end 46 of the outer pole member 44. The polarity of the magnet member 47 can be reversed from that shown in FIG. 7. A second end 49 of the magnet member 47 lies within the radial plane of the open end 45 of the outer pole member 44 and is provided with an inner pole member 50.

The outer and inner pole members, 44 and 50, define an annular flux gap 51 through which the portion of the hollow coil support tube 39 provided with the voice coil 41 is insertable. In other words, the coil support tube 39 provided with the voice coil 41 is sufficiently thin so as to fit within the annular flux gap 51 between the outer and inner pole members 44 and 50. Preferably, the coil support tube 39 has a thickness of about 0.005 inches and the voice coil 41 has a thickness of about 0.020 to 0.050 inches. The annular flux gap 51 preferably has a width of about 0.050 to 0.100 inches. The magnet assembly 43 depicted in FIGS. 6 and 7 also can be used in conjunction with the glass/graphite bearing embodiment shown in FIGS. 1 and 2.

FIGS. 8A to 8D show a third embodiment of a glass/graphite bearing according to the present invention. This embodiment provides a bearing which has a shorter axial length than the first or second embodiments.

Similar to the second embodiment, the third embodiment includes a Michelson interferometer as shown in FIG. 3 with a base block which has a beam splitter, a fixed mirror, a window for incoming light, a window for outgoing light and an opening for receiving a movable mirror, all constructed according to conventional design as described above. There is a movable mirror assembly 152, a stationary magnet assembly 153 and a voice coil linear motor. The magnet assembly 153 is held stationary by connection to the interferometer block 101. Preferably, supports (not shown) extending from the block are attached to a solid back plate 54 which is mounted to the magnet assembly 153. The movable mirror assembly 152 includes a movable mirror 155 mounted fixedly onto one end of a hollow coil support tube 156. The coil support tube 156 has a preferred diameter of about 2 inches or more and can be constructed of the same material as the coil support tube 139 of the first embodiment. A coil of conductive wire or voice coil 157 is wrapped around an outside portion of the coil support tube 156. The voice coil 157 can extend over the whole length of the coil support tube 156, but more preferably extends from the end of the coil support tube away from the movable mirror 155 to a point a predetermined distance from the movable mirror 155. Lead wires 158 connect the voice coil 157 to an electricity generating source (not shown).

Concentrically disposed within the coil support tube 156 is a bearing support tube 159, preferably comprised of glass (e.g., Pyrex® glass). The bearing support tube 159 is attached to the movable mirror 155 and supports a graphite bearing 160. The graphite bearing 160 can be a continuous cylinder or a plurality of rings. Preferably, the bearing support tube 159 has a length of about 1 to 3 inches.

The magnet assembly 153 has a glass, preferably Pyrex® glass, cylinder 161 as the innermost component. The inner diameter of the glass cylinder 161 and the outer diameter of the graphite bearing 160 are selected so that the graphite bearing 160 fits within the glass cylinder 161. Preferably, the inner diameter of the glass cylinder 161 is about 1.1 inches. As in the previously described embodiments, the graphite bearing 160 and glass cylinder 161 act together so the movable mirror assembly 152 smoothly slides within the magnet assembly 153.

Adjacent and surrounding the glass cylinder 161 is a circular internal magnetic flux guide 162. Surrounding and spaced a predetermined distance from the internal iron magnetic flux guide 162 is a radial field magnet 163. Adjacent and surrounding the radial field magnet 163 is an external magnetic flux guide 164. Between the internal flux guide 162 and the radial field magnet 163 is a flux gap 165 through which the portion of the hollow coil support tube 156 provided with the voice coil 157 is insertable. When the voice coil 157 has current flowing through it and is in the flux field an electromagnetic force results which linearly propels the overall movable mirror assembly 152 along the axis of the glass cylinder 161.

The glass/graphite bearing according to the present invention preferably employs a glass cylinder and graphite piston or bearing having circular cross sections because of their manufacturing ease. Due to the circular shape, however, the movable mirror may rotate around the axis of the movable mirror assembly as it travels along or within the glass cylinder. This rotation would not be troublesome except that it is difficult to mount the movable mirror absolutely perpendicular to the axis of rotation of the movable mirror assembly. If the movable mirror is not absolutely perpendicular, the mirror angle changes with respect to the beam splitter as the movable mirror assembly rotates. The change in mirror angle or "mirror tilt" adversely effects the interferometer's efficiency. Accordingly, the mirror rotation should be limited.

Figure 9:
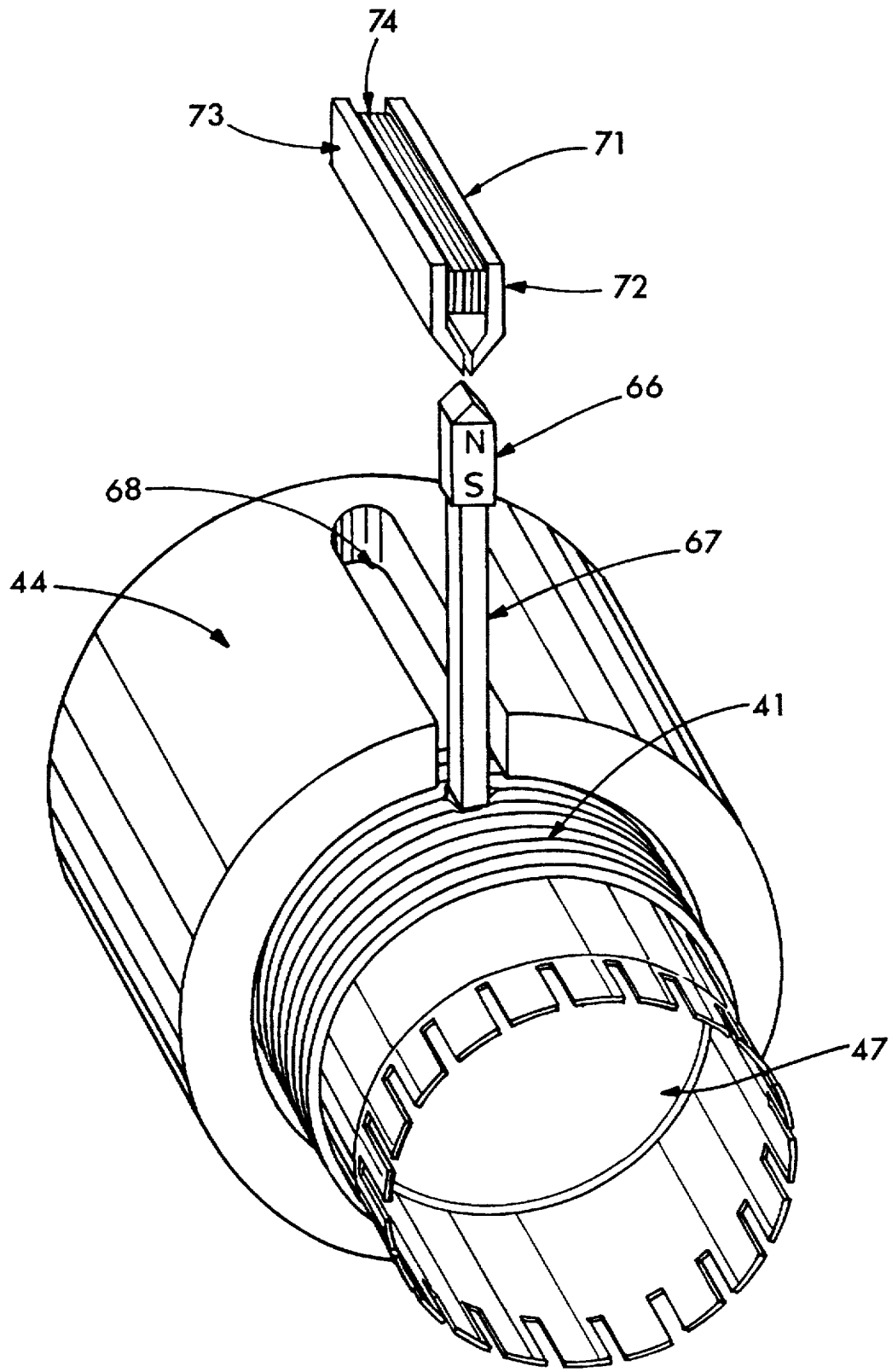
FIG. 9 is a perspective view of an anti-rotation system for the interferometer of the invention.
Figure 10:
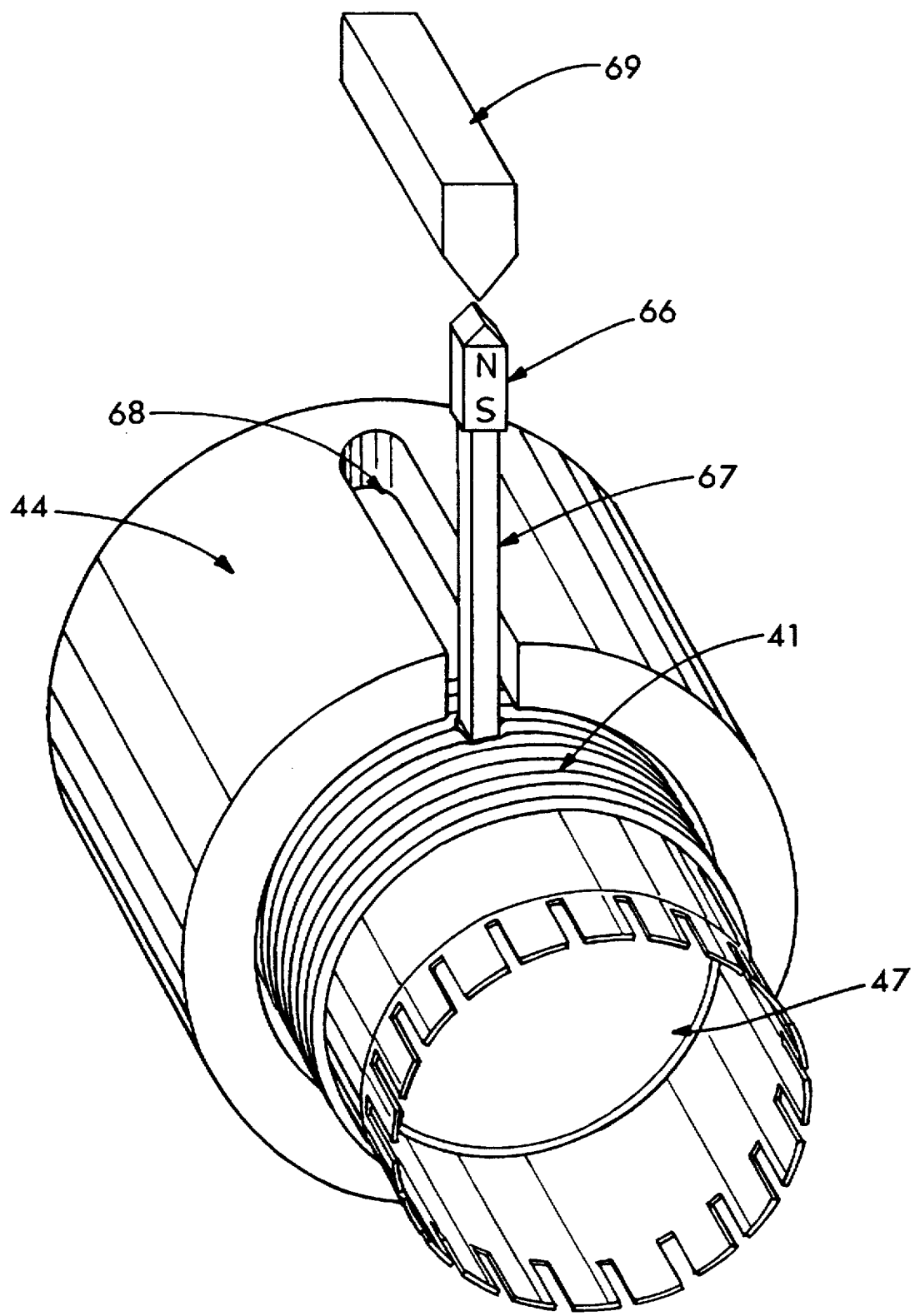
FIG. 10 is a perspective view of a second embodiment of the anti-rotation system.

According to a preferred embodiment of the present invention, best illustrated in FIGS. 5, 9 and 10, a magnetic anti-rotation system is provided to limit the mirror rotation. A permanent magnet 66 is coupled with the movable mirror assembly so that the magnet 66 and the movable mirror assembly rotate together. A preferred structure for coupling the magnet 66 with the movable mirror assembly is via a post 67 mounted on the coil support tube. The post 67 preferably has a height of about 1.5 inches. Alternatively, the magnet 66 can attached directly to the coil support tube via an adhesive.

In each of the glass/graphite bearing embodiments, a slot 68 is provided in the portion of the magnet assembly outside of or exterior to the coil support tube. As the movable mirror assembly moves, the post 67 passes within the slot 68. It is convenient, though not necessary, to pass the voice coil lead wires through the slot 68 and support them by the post 67.

In a passive magnetic anti-rotation system depicted in FIG. 10, a stationary solid guide rail 69, preferably made of iron, is provided at a predetermined radial distance above the slot 68. The solid guide rail 69 runs substantially parallel to the axis of the mirror assembly 9 or 23. As illustrated in FIG. 5, the guide rail 69 is secured to any stationary structure which is aligned with the glass cylinder, such as base 70. The permanent magnet 66 is attracted to the guide rail 69 thus preventing rotation of the movable mirror assembly. The poles of the permanent magnet 66 can be aligned parallel to guide rail 69 as depicted in FIG. 5 or they can be aligned perpendicular to the guide rail 69 as illustrated in FIGS. 9 and 10. The distance between the permanent magnet 66 and the guide rail 69 is sufficiently small to assure attraction but not so small as to interfere adversely with the movement of the mirror assembly. Moreover, the attraction of the permanent magnet 66 toward the guide rail 69 supports a portion of the weight of the mirror assembly, thus reducing the friction along the glass/graphite bearing surface.

In an active magnetic anti-rotation system illustrated in FIG. 9, in place of the solid guide rail 69 there is a guide rail 71 which is split into two separate halves 72 and 73 to form two magnetic poles. A coil of conductive wire 74 is wound around the central part of the guide rail 71 between the two halves 72 and 73. The coil 74 is connected via lead wires to an electricity-generating source (not shown). When there is no current flowing through the guide rail coil 74, the permanent magnet 66 is attracted equally to both halves 72 and 73 and the post 67 is positioned at the middle of the split guide rail 71. When there is current flowing through the guide rail coil 74, the permanent magnet 66 is attracted to one half 72 of the split guide rail 71 more than the other. This differential attraction causes the movable mirror to rotate toward the half 72 of the split guide rail 71 having the increased magnetic attraction. Adjusting the amount of current flowing through the coil 74 fine-tunes the mirror rotation by a few degrees. The active anti-rotation system can provide remote adjustment or active control of the mirror rotation.

The glass/graphite bearing according to the present invention can be used with a vertical or horizontal interferometer assembly. The terms "vertical" and "horizontal" refer to the relationship of the direction of travel of the moving mirror with respect to gravity. An advantage of the glass/graphite bearing is that it provides a low weight movable mirror assembly that allows the construction of cheaper and smaller vertical interferometers. A vertical interferometer has several advantages in comparison to a horizontal interferometer. The linear voice coil motor suspends the weight of the movable mirror magnetically so that the glass/graphite bearing has virtually no static loads placed on it, thus reducing the friction. Moreover, the vertical movement of the center of mass of the movable mirror assembly does not effect the static loading of the bearing system. In a horizontal interferometer the weight of the movable mirror bends the bearing system as the center of mass moves thereby causing mirror tilt.

Any of the above-described embodiments can be utilized in a vertical interferometer. The third embodiment is particularly advantageous for use in a vertical interferometer since the larger linear voice coil motor can support a lower weight movable mirror. The covering arrangement of the voice coil also prevents dust or particles from falling into the glass/graphite bearing.

The glass/graphite bearing according to the present invention is also advantageously used in a horizontal interferometer. When horizontal, the glass/graphite bearing has a certain amount of friction along the bearing surface which provides a simple method for performing an accurate step scan data collection. If the driving means for the movable mirror assembly is turned off, the friction will stop the movable mirror in a few milliseconds and hold it with a degree of precision that conventional active step scan interferometers cannot achieve without a complicated secondary control system. The trapped air in the narrow bearing clearance provides a damping effect which further contributes to the stopping of the movable mirror assembly. In addition, this damping renders the interferometer less sensitive to external vibrations.

These methods will be described with reference to the preferred glass/graphite bearing embodiment shown in FIGS. 4, 6 and 7 but are also applicable to the other embodiments of the invention. It is understood, however, that the methods described below are not the only methods for mounting and aligning the movable mirror but that the movable mirror also can be mounted via conventional means.

Figure 11:
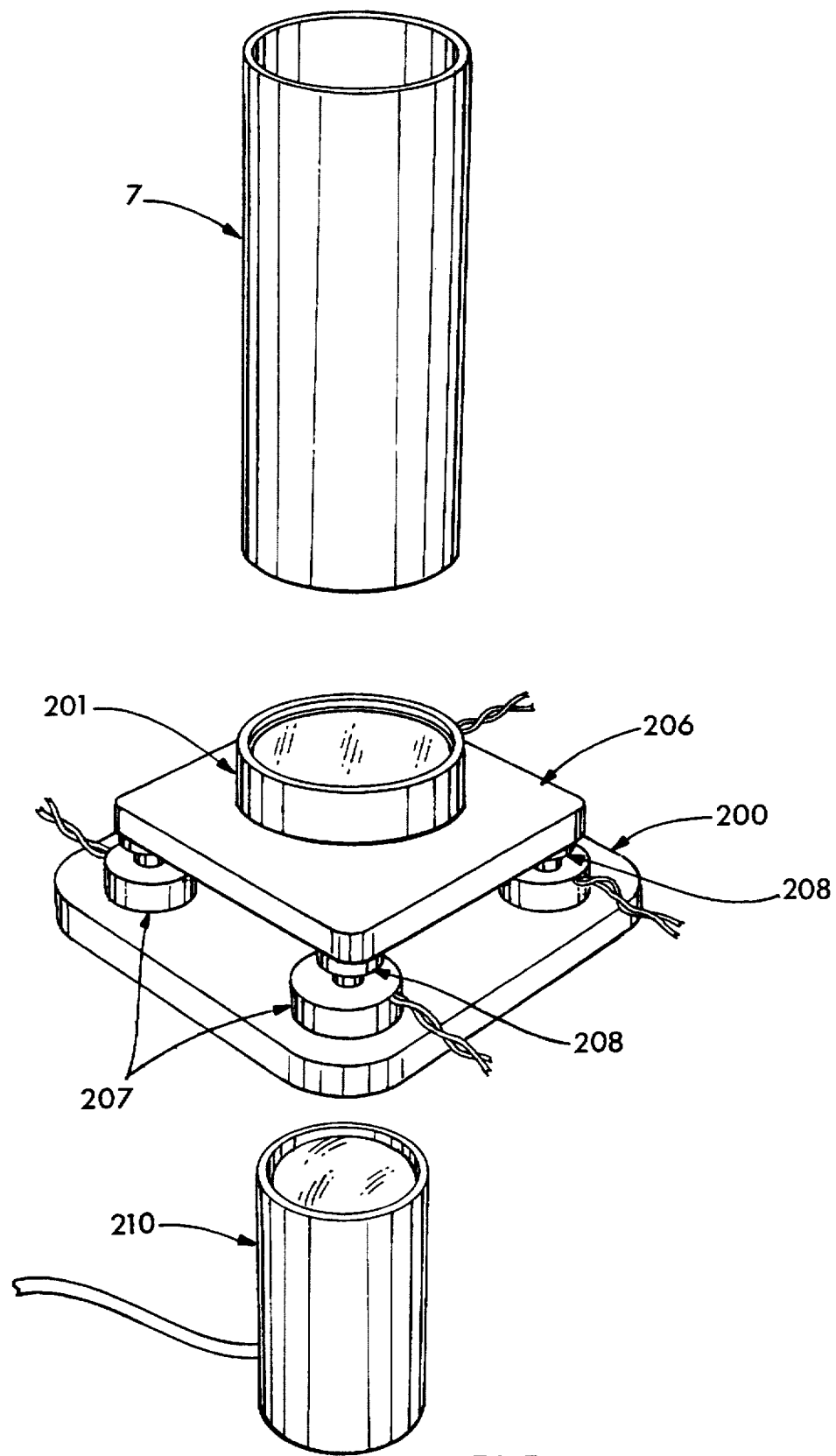
FIG. 11 is a perspective view illustrating a preferred method of aligning the mirror on the bearing of the invention.
Figure 12:
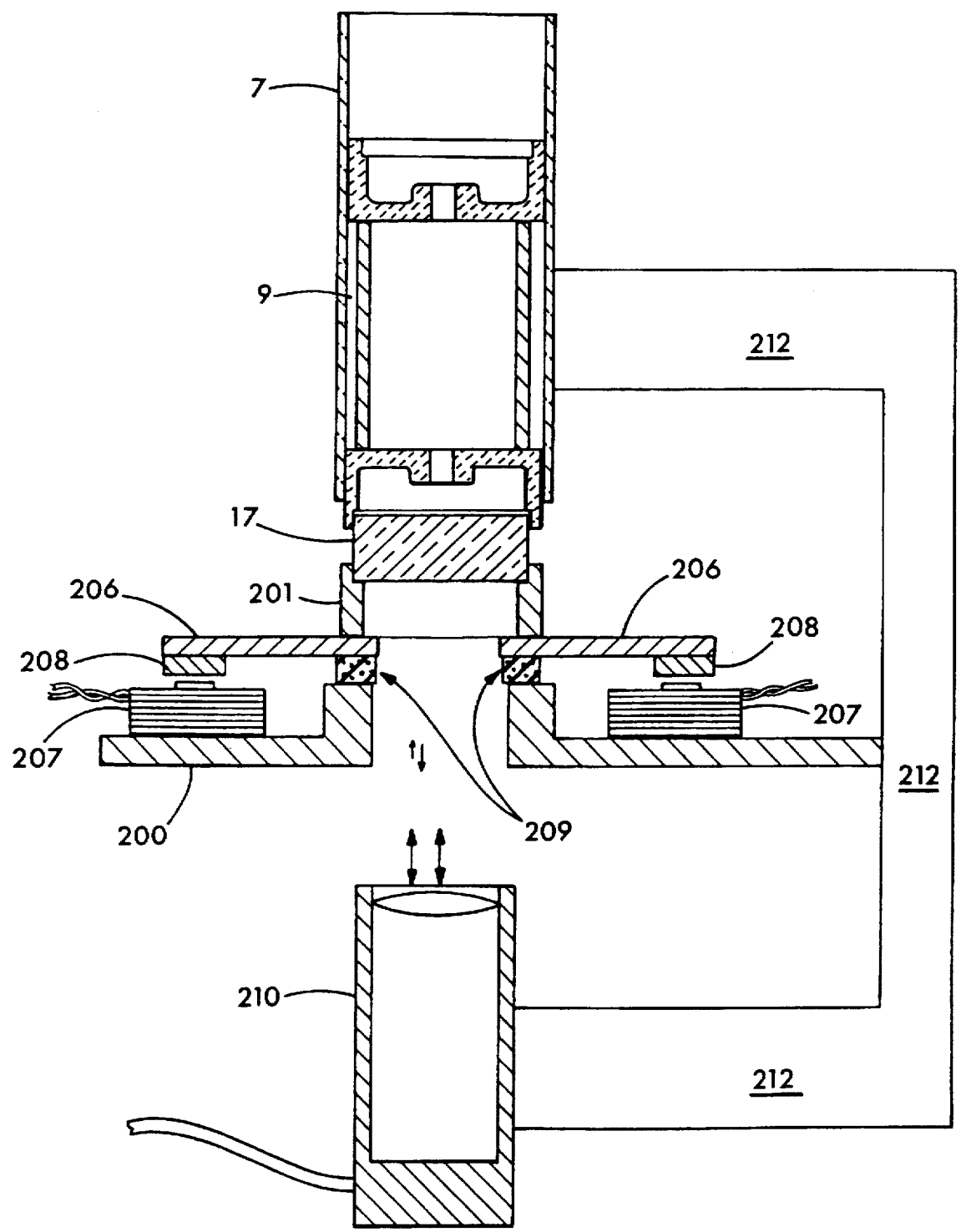
FIG. 12 is a cross-sectional view of the mechanism used in the alignment method.

A preferred method of alignment of the moving mirror assembly is illustrated in the views of FIGS. 11 and 12. An autocollimator 210 is used to align both the glass tube in the interferometer block, and to align the mirror as it is attached to the graphite piston assembly. The autocollimator also provides numbers from a digital readout for statistical process control that are free of operator variation.

The fixture 200 shown in FIGS. 11 and 12 is used to align automatically the mirror with respect to the graphite piston assembly. An autocollimator 210 views the face of the moving mirror throughout the assembly process. The output of the autocollimator 210 drives an electronic servo system which aligns the mirror.

The graphite piston assembly 9 is held in a glass tube 7 or against a "V" block holding means (not shown). The graphite piston holding means allows the piston assembly 9 to move up and down and to rotate but does not allow the piston assembly to tilt.

The mirror 17 which is to be attached to the graphite piston assembly 9 is held in a cup 201 face down so that the graphite piston assembly can be lowered over the mirror and glued to it.

The mirror cup is held by an adjustable plat 206 which can be tilted or adjusted in angle with respect to the graphite piston holding means. The tilting mechanism uses four coils of wire 207 and four permanent magnets 208 attached to the adjustable plate. The plate is supported by an elastic pad 209 which allows it to move slightly and tilt as needed. The adjustable plate is controlled by an electronic servo system (not shown) using the X and Y outputs of the autocollimator 210 to drive the four coils of wire 207 which magnetically move the adjustable plate.

The mirror cup 201, the cup support plate 208, and the elastic pad 209 all have a hole through them. This hole is used to allow light from the autocollimator 210 to reflect off of the face of the mirror 17 which is face down in the cup. The autocollimator is fixedly attached by a bracket 212 to the graphite piston holding means. The autocollimator is used to electronically adjust the angle of the adjustable plate until the mirror is in the proper position. After the glue sets the mirror is glued to the graphite piston assembly and the finished graphite piston moving mirror assembly can be removed, and the process repeated. An exemplary autocollimator is made by Micro-radian, San Marcos, Calif., model MRA-240, and has analog and digital electronic read-outs that permit it to interface to the automatic alignment system.

The autocollimator must be calibrated (aligned) with respect to the moving mirror holding means. If the moving mirror assembly were perfect, all one would have to do is to place the moving mirror assembly in the moving mirror holding means and adjust the holding means until the autocollimator X and Y outputs go to zero. Then the moving mirror assembly holding means can be locked in place.

The autocollimator makes calibration possible even if the mirror on the graphite piston is mounted with an error in angle. The angle of the autocollimator can be calibrated by noting the change in the output values of the autocollimator as the moving mirror assembly is rotated. The autocollimator X and Y outputs will go up and down. The autocollimator must be aligned so that the output signal goes just as far negative as it goes positive. If both the X and Y axes of the autocollimator are aligned so that the average of the X and Y outputs are zero, then the axis of rotation is perpendicular to the autocollimator. After this adjustment, the autocollimator is locked in place with respect to the moving mirror holding means. This alignment should be permanent, but the alignment can be verified at any time simply by rotating a finished moving mirror assembly and noting the autocollimator outputs. This rotation allows a good way to test the alignment of the finished moving mirror assembly. As the moving mirror assembly rotates, any error in mirror angle will show as a sinusoidal wobble in the autocollimator X and Y output values. If the mirror is correctly mounted there will be a very small wobble in the autocollimator value.

It is understood that the invention is not limited to the embodiments set forth herein as illustrative, but embraces all such modified forms thereof as come within the scope of the following claims.

What is claimed is:

1. An improved interferometer of the type having a stationary block, a beam splitter, a stationary mirror, a mirror which is movable relative to said stationary block, and means for propelling said movable mirror, the improvement comprising:

(a) a stationary cylinder having a hollow bore, which is mounted to the block, and (b) a movable assembly including the movable mirror and at least one piston member, wherein said piston member is slidably disposed within the bore of said cylinder and conforms to the bore of the cylinder, one of the cylinder and piston member being formed of glass and the other formed of graphite, wherein the mirror is fixedly attached to the piston member to be supported by it, wherein said movable assembly has an axis of rotation and said interferometer further comprises a magnet coupled with said movable assembly and a stationary guide rail positioned substantially parallel to said axis of rotation and at a predetermined radial distance from said movable assembly, said magnet being magnetically attracted to said guide rail so as to prevent unwanted rotation of said movable assembly.

2. The interferometer of claim 1, further comprising a post having a first end attached to said movable assembly and a second end upon which said magnet is mounted.

3. The interferometer of claim 1, wherein said guide rail comprises a first section, a second section and a coil of wire placed between said first and second sections, said first and second sections forming two opposite magnetic poles, respectively.

4. An improved interferometer of the type having a stationary block, a beam splitter, a stationary mirror, a mirror which is movable relative to said stationary block, and means for propelling said movable mirror, the improvement comprising:

(a) a stationary cylinder having a hollow bore, which is mounted to the block, (b) a movable assembly including the movable mirror and at least one piston member, wherein said piston member is slidably disposed within the bore of said cylinder and conforms to the bore of the cylinder, one of the cylinder and piston member being formed of glass and the other formed of graphite, wherein the mirror is fixedly attached to the piston member to be supported by it, wherein said movable assembly comprises first and second graphite pistons, each of which have an open end and a closed end, and a spacer tube positioned between said first and second graphite pistons, and wherein said movable mirror is mounted on said open end of said first graphite piston, and wherein said propelling means comprises a hollow coil support tube having a first end attached to said open end of said second graphite piston, a coil of conductive wire wrapped around said coil support tube and a stationary magnet assembly having an opening for receiving a second end of said coil support tube, wherein said movable assembly has an axis of rotation and further comprises a post having a first end attached to said coil support tube, a magnet mounted on a second end of said post and a stationary guide rail positioned substantially parallel to said axis of rotation and at a predetermined radial distance from said coil support tube, said magnet being magnetically attracted to said guide rail so as to prevent unwanted rotation of said movable assembly.

5. The interferometer of claim 4, wherein said stationary magnet assembly is provided with a slot within which said post moves as said coil support tube moves.

6. The interferometer of claim 4, wherein said guide rail comprises a first section, a second section and a coil of wire placed between said first and second sections, said first and second sections forming two opposite magnetic poles, respectively.

7. An improved interferometer of the type having a stationary block, a beam splitter, a stationary mirror, a mirror which is movable relative to said stationary block, and means for propelling said movable mirror, the improvement comprising:

(a) a stationary cylinder having a hollow bore, which is mounted to the block, and (b) a movable assembly including the movable mirror and at least one piston member, wherein said piston member is slidably disposed within the bore of said cylinder and conforms to the bore of the cylinder, one of the cylinder and piston member being formed of glass and the other formed of graphite, wherein the mirror is fixedly attached to the piston member to be supported by it, wherein said piston member comprises a graphite piston having a closed end and an open end, and said movable mirror is mounted on said closed end, and wherein said propelling means comprises a stationary magnet assembly having an annular flux gap, a coil of conductive wire and a movable hollow coil support tube around which said wire coil is wrapped, wherein a first end of said wire-wrapped coil support tube is insertable in said annular flux gap and a second end is attached to said open end of said graphite piston, wherein said movable assembly has an axis of rotation and said interferometer further comprises a post having a first end attached to said coil support tube, a magnet mounted on a second end of said post and a stationary guide rail positioned substantially parallel to said axis of rotation and at a predetermined radial distance from said coil support tube, said magnet being magnetically attracted to said guide rail so as to prevent unwanted rotation of said movable assembly.

8. The interferometer of claim 7, wherein said stationary magnet assembly is provided with a slot within which said post moves as said coil support tube moves.

9. The interferometer of claim 7, wherein said guide rail comprises a first section, a second section and a coil of wire placed between said first and second sections, said first and second sections forming two opposite magnetic poles, respectively.

10. An improved interferometer of the type having a stationary block, a beam splitter, a stationary mirror, a mirror which is movable relative to said stationary block, and means for propelling said movable mirror, the improvement comprising:

(a) a stationary cylinder having a hollow bore, which is mounted to the block, and (b) a movable assembly including the movable mirror and at least one piston member, wherein said piston member is slidably disposed within the bore of said cylinder and conforms to the bore of the cylinder, one of the cylinder and piston member being formed of glass and the other formed of graphite, wherein the mirror is fixedly attached to the piston member to be supported by it, and further comprising a bearing support tube which supports said cylinder wherein said propelling means comprises a stationary magnet assembly having an annular flux gap, a coil of conductive wire and a movable hollow coil support tube around which said wire coil is wrapped, wherein said wire-wrapped coil support tube is fixed to said movable mirror and surrounds said bearing support tube and graphite member, and wherein said hollow glass cylinder is disposed within said magnet assembly, wherein said movable assembly has an axis of rotation and said interferometer further comprises a post having a first end attached to said coil support tube, a magnet mounted on a second end of said post and a stationary guide rail positioned substantially parallel to said axis of rotation and at a predetermined radial distance from said coil support tube, said magnet being magnetically attracted to said guide rail so as to prevent unwanted rotation of said movable assembly.

11. The interferometer of claim 10, wherein said stationary magnet assembly is provided with a slot within which said post moves as said coil support tube moves.

12. The interferometer of claim 11, wherein said guide rail comprises a first section, a second section and a coil of wire placed between said first and second sections, said first and second sections forming two opposite magnetic poles, respectively.

13. A bearing for an interferometer comprising:

(a) a stationary cylinder having a hollow bore;

(b) a movable assembly including a movable mirror for an interferometer and at least one piston member wherein said piston member is slidably disposed within the bore of said cylinder and conforms to the bore of the cylinder, one of the cylinder and piston member being formed of glass and the other formed of graphite, wherein the mirror is fixedly attached to the piston member to be supported by it, wherein said movable assembly has an axis of rotation and a magnet coupled with said movable assembly and a stationary guide rail positioned substantially parallel to said axis of rotation and at a predetermined radial distance from said movable assembly, said magnet being magnetically attracted to said guide rail so as to prevent unwanted rotation of said movable assembly.

14. The bearing of claim 13, further comprising a post having a first end attached to said movable assembly and a second end upon which said magnet is mounted.

15. The bearing of claim 13, wherein said guide rail comprises a first section, a second section and a coil of wire place between said first and second sections, said first and second sections forming two opposite magnetic poles respectively.

16. A bearing for an interferometer comprising:

(a) a stationary cylinder having a hollow bore;

(b) a movable assembly including a movable mirror for an interferometer and at least one piston member wherein said piston member is slidably disposed within the bore of said cylinder and conforms to the bore of the cylinder, one of the cylinder and piston member being formed of glass and the other formed of graphite, wherein the mirror is fixedly attached to the piston member to be supported by it, wherein said movable assembly comprises first and second graphite pistons, each of which have an open end and closed end, and a spacer tube positioned between said first and second graphite pistons, and wherein said movable mirror is mounted on said open end of said first graphite piston, and a hollow coil support tube having a first end attached to said open end of said second graphite piston, a coil of conductive wire wrapped around said coil support tube and a stationary magnet assembly having an opening for receiving a second end of said coil support tube, wherein said movable assembly has an axis of rotation and further comprises a post having a first end attached to said coil support tube, a magnet mounted on a second end of said post and a stationary guide rail positioned substantially parallel to said axis of rotation and at a predetermined radial distance from said coil support tube, said magnet being magnetically attached to said guide rail so as to prevent unwanted rotation of said movable assembly.

17. The bearing of claim 16 wherein said stationary magnet assembly is provided with a slot within which said post moves as said coil support tube moves.

18. The bearing of claim 16, wherein said guide rail comprises a first section, a second section and a coil of wire placed between said first and second sections, said first and second sections forming two opposite magnetic poles, respectively.

19. A bearing for an interferometer comprising:

(a) a stationary cylinder having a hollow bore:

(b) a movable assembly including a movable mirror for an interferometer and at least one piston member wherein said piston member is slidably disposed within the bore of said cylinder and conforms to the bore of the cylinder, one of the cylinder and piston member being formed of glass and the other formed of graphite, wherein the mirror is fixedly attached to the piston member to be supported by it, and wherein said piston member comprises a graphite piston having a closed end and an open end, and said movable mirror is mounted on said closed end, a stationary magnet assembly having an annular flux gap, a coil of conductive wire and a movable hollow coil support tube around which said wire coil is wrapped, wherein a first end of said wire-wrapped coil support tube is insertable in said annular flux gap and a second end is attached to said open end of said graphite piston, wherein said movable assembly has an axis of rotation and further comprising a post having a first end attached to said coil support tube, a magnet mounted on a second end of said post and a stationary guide rail positioned substantially parallel to said axis of rotation and at a predetermined radial distance from said coil support tube, said magnet being magnetically attracted to said guide rail so as to prevent unwanted rotation of said movable assembly.

20. The bearing of claim 19, wherein said stationary magnet assembly is provided with a slot within which said post moves as said coil support tube moves.

21. The bearing of claim 19, wherein said guide rail comprises a first section, a second section and a coil of wire placed between said first and second sections, said first and second sections forming two opposite magnetic poles, respectively.

* * * * *